United States Patent Office 3,346,634
Patented Oct. 10, 1967

3,346,634
PROCESS FOR THE PREPARATION OF N-SUBSTITUTED AMIDES OF DIPHENYL-ACETIC ACID
Haldor Christensen, Martin E. Hultquist, and Thomas D. Waugh, Boulder, Colo., assignors, by mesne assignments, to Syntex Corporation, Panama, Panama, a corporation of Panama
No Drawing. Filed Mar. 20, 1964, Ser. No. 353,603
5 Claims. (Cl. 260—558)

This invention relates to a novel process for the preparation of N-substituted amides from economical, readily available hydrocarbons in a simple process which is readily adaptable to large-scale operations. Particularly, this invention relates to an improved process for the preparation of N-substituted amides of diphenylacetic acid.

The N-substituted diphenylacetic acid amides may be represented by the general formula:

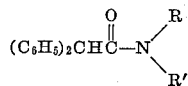

In this and succeeding formulas,

is a residue of a nitrogen base in which R and R' are hydrocarbon in nature. R and R' may be the same or different.

The N-substituted amides of diphenylacetic acid are biologically active compounds useful as pesticides and are further useful as intermediates for the production of pharmacologically active compounds. Known methods employ tedious, multistep procedures requiring first the preparation of the acid followed by conversion of the acid through conventional steps to the amide. One presently known method for the preparation of amides of diphenylacetic acid employs a sequence of reactions, starting with diphenylmethane as its sodium derivative, namely, diphenylmethyl sodium. In the preparation, diphenylmethyl sodium is carbonated, then acidified to produce diphenylacetic acid, which is then converted with thionyl chloride to its acid chloride and the acid chloride is then reacted with an amine to produce the desired amide. This procedure may be represented by the following sequence of steps:

$(C_6H_5)_2CHNa + CO_2 \rightarrow (C_6H_5)_2CHCOONa$ (I)

$(C_6H_5)_2CHCOONa + H^+ \rightarrow (C_6H_5)_2CHCOOH$ (II)

$(C_6H_5)_2CHCOOH + SOCl_2 \rightarrow$
$\qquad (C_6H_5)_2CHCOCl + SO_2 + HCl$ (III)

$(C_6H_5)_2CHCOCl + HNRR' \rightarrow (C_6H_5)_2CHCONRR'$ (IV)

Another method employs benzaldehyde as starting material. In such preparation, the benzaldehyde is condensed with hydrogen cyanide to produce benzaldehyde cyanohydrin which is then reacted with benzene in the presence of boron trifluoride to produce diphenylacetonitrile which is thereafter hydrolyzed to obtain diphenylacetic acid, which is then followed by the preparation of acid chloride and amidation as in the above described process. This procedure may be represented by the following sequence of steps:

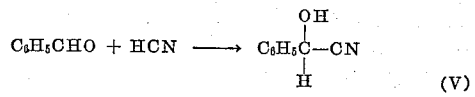 (V)

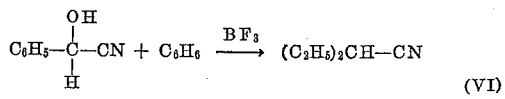 (VI)

$(C_6H_5)_2CH—CN + H_2O \rightarrow (C_6H_5)_2CH—COOH$ (VII)

$(C_6H_5)_2CH—COOH + SOCl_2 \rightarrow$
$\qquad (C_6H_5)_2CH—COCl + SO_2 + HCl$ (VIII)

$(C_6H_5)_2CH—COCl + HNRR' \rightarrow$
$\qquad (C_6H_5)_2CH—CONRR'$ (IX)

The limitations of the latter method (Equations V to IX), burdened by a lengthy, multistep process, are apparent. Even the shorter method employing known processes (Equations I to IV) is a multistep operation with the limitations associated with multiplication of steps when a production process is desired. Moreover, both methods employ thionyl chloride which produces sulfur dioxide and hydrogen chloride as by-products. The latter by-products are noxious and reactive gaseous chemicals and while they may not interfere with recovery or use of the intermediate acid chloride, they do present a problem of disposal, especially when industrial manufacture is contemplated.

According to the present invention, it has been discovered that high yields of N-substituted diphenylacetic acid amides may be obtained by a novel reaction which can be carried out in a single-step clean-cut reaction between diphenylmethyl sodium and an N-substituted carbamyl chloride. The reaction may be represented by the following equation:

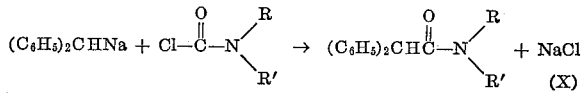 (X)

The reaction is entirely novel. The reaction completely avoids the necessity for preparing or using diphenylacetic acid. The process is free of the operating inadequacies of known methods. Starting with diphenylmethyl sodium, the desired product is obtained in a single step with easily disposable, non-hazardous sodium chloride as by-product. Diphenylmethyl sodium is easily prepared in situ from diphenylmethane, which is readily available in large-scale commercial quantities. The by-product may be removed readily from the reaction mixture by a simple washing step. Hence, there is provided a simple method for preparing high yields of N-substituted amides from a readily available starting material and which is furthermore adaptable to large-scale operations.

The carbamyl chlorides,

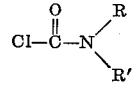

which may be employed in the novel process are those in which

is a residue of a nitrogen base in which R and R' are hydrocarbon in nature and are free of reactive groups such as hydroxy, acid or halogen groups. Preferred carbamyl chlorides are those in which R and R' are alkyl and include dimethylcarbamyl chloride, diethylcarbamyl chloride, di-n-propylcarbamyl chloride, ethylmethylcarbamyl chloride, methyl-n-butylcarbamyl chloride, ethyl-n-propylcarbamyl chloride, di-n-butylcarbamyl chloride, di-amylcarbamyl chloride, etc.

The diphenylmethyl sodium reactant is most conveniently prepared immediately prior to carrying out the reaction with a carbamyl chloride compound by adding diphenylmethane to a solution of phenyl sodium prepared by adding chlorobenzene to a dispersion of sodium in a suitable aromatic solvent and heating the mixture of diphenylmethane and phenyl sodium at a temperature in the range of from about 70° C. to about 150° C. for from about one-quarter hour to about two hours and thereafter cooling. The dispersion of diphenylmethyl sodium thus prepared is ready for use in carrying out the preparation of the amide according to the present invention. The dispersion of diphenylmethyl sodium may be in any inert aromatic or aliphatic hydrocarbon diluent. Aromatic solvents such as benzene, toluene, xylene, ethylbenzene, diethylbenzene, etc. are preferred. Any art-known modification for making diphenylmethyl sodium may be substituted.

In carrying out the process of the present invention, a slurry of diphenylmethyl sodium in an inert solvent is added to the appropriate carbamyl chloride to produce the desired N-substituted amide of diphenylactic acid and sodium chloride by-product. If desired, the carbamyl chloride may be diluted with an appropriate solvent such as a hydrocarbon, ether or the like. The solvent should be essentially inert to both the diphenylmethyl sodium and to the carbamyl chloride compound at the reaction temperature to be employed. Preferred solvents, where they may be desirable for purposes of ease of handling of the reaction, are the saturated alkyl hydrocarbons such as pentane, hexane, heptane, cyclopentane, cyclohexane, etc., and such aromatic hydrocarbons as benzene, toluene, the xylenes, diethylbenzene, etc. Ethers, such as diethyl ether, diisopropyl ether, tetrahydrofuran, etc. also may be employed.

The reaction may be carried out in the temperature range of from about −70° C. to about 150° C., but is preferably and most conveniently carried out at temperatures in the range of from about −15° C. to about 50° C., where good yields of high quality products are obtained. The most desirable temperature may vary depending on the particular reactants employed and, when carried out in large-scale operations, on the economics of handling the particular preparation on such scale.

The reaction is exothermic and substantially instantaneous. Time of reaction is not critical for the formation of the product, time being limited only by the rate at which the heat of reaction can be removed from the reaction mixture. This, of course, is a function of the cooling efficiency of the particular equipment in which the reaction is carried out and the size of the operation. In the laboratory, on a small scale, efficient cooling is readily attained and the reaction may be completed easily in ten minutes. On a plant scale, where volumes are large and cooling may be less efficient, several hours may be taken to complete the addition of the diphenylmethyl sodium.

The process may be carried out employing a ratio of carbamyl chloride to diphenylmethyl sodium of from about 0.75 to about 1.5 molar proportions. A ratio of carbamyl chloride to diphenylmethyl sodium of from about 0.9 to 1.1 is preferred.

The order of addition of the reactants to each other is critical in order to achieve the good results anticipated in this invention. Some product may be obtained by adding the carbamyl chloride to the diphenylmethyl sodium dispersion, but to achieve the good results anticipated for this process, it is necessary to add the diphenylmethyl sodium to the carbamyl chloride. The sodium chloride which is produced in this reaction may simply be dissolved away from the desired product by adding water to the final reaction mixture. The aqueous phase containing the sodium chloride may then be separated from the desired product by conventional means, such as by drawing off the aqueous phase, and the desired product may be obtained from the organic solvent phase by cooling to precipitate the product and filtering to recover the precipitate, or by distilling off the solvent to recover the product as residue.

In a preferred method for carrying out the process of this invention, a suspension of diphenylmethyl sodium in xylene or other inert hydrocarbon diluent is added slowly, with stirring, to the appropriate carbamyl chloride compound in an inert solvent in the temperature range of from about −15° to about 50° C. for a time sufficient to complete the reaction and to obtain the desired N-substituted diphenylacetamide product and sodium chloride by-product.

The product conveniently may be isolated from the reaction mixture by adding water to the mixture to dissolve the sodium chloride, adjusting the aqueous phase to a pH in the range of from about 4 to about 9 with acetic acid or mineral acid, adding additional xylene or other appropriate solvent if it appears that it may be required to dissolve the product, warming the mixture in the temperature range of from about 50° to about 150° C. until the product and by-product have dissolved in the organic and aqueous phases respectively, and thereafter separating the phases by drawing off the aqueous phase by decantation, etc. In the above operation, acidification to adjust the pH is not essential but has been found to be of aid in the separation of the aqueous and organic phases. The product may be recovered from the organic solution by vaporizing off the solvent in an amount sufficient to induce crystallization of the desired N-substituted diphenylacetamide product and thereafter recovering the solid by filtration or centrifugation or by completely vaporizing off the solvent and recovering the product as residue. The product may then be purified, if desired, by washing or recrystallizing from an appropriate solvent such as xylene, toluene, diethylbenzene, benzene-pentane, aromatic-aliphatic hydrocarbon mixtures, alcohols, acetone-water, etc.

Although the foregoing operations have been found to be desirable methods for recovering and purifying the desired product, modifications of the foregoing methods or other methods known to the skilled in the art may be employed.

The following examples illustrate the invention but are not to be construed as limiting:

EXAMPLE 1

*N,N-dimethyl-2,2-diphenylacetamide*

A sodium dispersion was prepared by heating a mixture of 24.2 grams (1.05 gram atoms) of sodium, 125 milliliters of xylene and 0.24 gram of aluminum monostearate in an inert atmosphere to a temperature above the melting point of sodium and dispersing the sodium in a "Dispersator" (a commercially available sodium dispersion preparation apparatus) by means of rapid agitation. The sodium dispersion thus produced was rinsed into a reaction vessel with 190 milliliters of xylene, and 56.3 grams (0.50 mole) of chlorobenzene was added thereto while holding the reaction temperature at about 20° to 30° C. Diphenylmethane (88.0 grams, 0.525 mole) was then added and the mixture was refluxed at about 120° C. for about 45 minutes. The suspension of diphenylmethyl sodium was then cooled to room temperature.

The suspension of about 0.50 mole of diphenylmethyl sodium in 315 milliliters of xylene prepared as described above, was added with stirring to a solution of 48.5 grams (0.45 mole) of dimethylcarbamyl chloride in 200 milliliters of xylene while the reaction temperature was maintained between 5° and 15° C. After the addition was complete, 250 ml. of water and 15 ml. of acetic acid was added to bring the pH of the aqueous phase to about pH 5. The mixture was heated to 75° C., stirring was then stopped and the layers were allowed to separate. The aqueous phase was drawn off and the organic phase was washed with 250 milliliters of hot water. The organic phase was reduced in volume to 320 milliliters by vacuum distillation and was then filtered, hot, through a Solkafloc dressed filter. The solution was cooled to about 10° to 15° C. during which cooling a solid product precipitated. The solid was collected by filtration, washed twice with two 100-milliliter portions of cold xylene and dried to obtain the desired N,N-dimethyl-2,2-diphenylacetamide product having a melting point of 132° to 134° C. The mother liquors and washes were reduced in volume to about 100 milliliters and cooled to 0° C. to obtain a second crop of the product. The yield of the N,N-dimethyl-2,2-diphenylacetamide product was 93.8 grams or 87.2% of theory, base on the limiting dimethylcarbamyl chloride.

EXAMPLE 2

N,N-dimethyl-2,2-diphenylacetamide

In a manner similar to that described in Example 1, a suspension of about 0.50 mole of diphenylmethyl sodium prepared from 24.2 grams (1.05 gram atoms) of sodium, 84.0 grams (0.50 mole) of diphenylmethane and 56.3 grams (0.50 mole) of chlorobenzene in a mixture of 125 milliliters of diethylbenzene and 200 milliliters of benzene was added with stirring to a solution of 53.8 grams (0.50 mole) of dimethylcarbamyl chloride in 200 milliliters of benzene over a period of about 35 minutes while the reaction mixture was maintained at from about 25° to about 30° C. The mixture was allowed to stir for an additional 5 minutes after all of the diphenylmethyl sodium had been added and then 20 milliliters of methanol was added, followed by 400 milliliters of water. The mixture was then warmed to about 70° C. and the organic and aqueous layers allowed to separate. The aqueous layer was drawn off and the hot organic layer was washed with about 300 milliliters of hot water. The organic solvents were then removed by distilling under vacuum to obtain the desired N,N-dimethyl-2,2-diphenylacetamide product as residue. The crude product was recrystallized from diethylbenzene to obtain 87.8 grams of a purified product having a melting point of 133° to 134° C. The mother liquor and washes were then reduced in volume by distillation to obtain a second crop of product having a melting point of 131° to 134° C. The N,N-dimethyl-2,2-diphenylacetamide product gave no melting point depression on a mixed melting point with an authentic sample of N,N-dimethyl-2,2-diphenylacetamide prepared by the reaction of 2,2-diphenylacetyl chloride and dimethylamine. The yield of the product mounted to 93.8 grams, or 78.5 percent of the theoretical.

EXAMPLE 3

N,N-dimethyl-2,2-diphenylacetamide

In a manner similar to that previously described, a suspension of about 0.45 mole of diphenylmethyl sodium prepared from 24.2 grams (1.05 grams atoms) of sodium, 75.6 grams of diphenylmethane and 56.3 grams (0.50 mole) of chlorobenzene in 315 milliliters of xylene was added with stirring to a solution of 59.1 grams (0.55 mole) of dimethylcarbamyl chloride in 200 milliliters of xylene over a period of about 25 minutes while the reaction mixture was maintained in the temperature range of from about 5° to about 10° C. The mixture was allowed to stir for an additional 5 minutes and then 250 milliliters of water was added, followed by 7 milliliters of acetic acid. In a manner similar to that previously described the mixture was then warmed to about 80° C., the organic and aqueous layers separated, the organic layer was washed with 250 milliliters of hot water, then concentrated to about 400 milliliters, filtered hot, the filter washed with 75 milliliters of xylene and the filtrate cooled to precipitate the desired N,N-dimethyl-2,2-diphenylacetamide product. The first crop amounted to 74.7 grams of a product having a melting point of 132° to 134° C. The mother liquor and xylene wash was concentrated to recover a second crop of product melting at 131° to 132° C. The yield of the two crops amounted to 91.0 grams or 84.7 percent of theory.

EXAMPLE 4

N,N-dimethyl-2,2-diphenylacetamide

In a manner similar to that previously described, a suspension of about 0.175 mole of diphenylmethyl sodium was prepared from 8.45 grams (0.368 gram atom) of sodium, 30.4 grams (0.184 mole) of diphenylmethane and 19.7 grams (0.175 mole) of chlorobenzene in 125 milliliters of diethylbenzene.

About one-third of the suspension prepared as above described and containing about 0.06 mole of diphenylmethyl sodium was added to a solution of 7 grams (0.065 mole) of N,N-dimethylcarbamyl chloride in 100 milliliters of xylene at a temperature of about −75° C. during a period of about 15 minutes. The temperature was maintained at about −75° C. in a Dry Ice acetone bath. The mixture was stirred an additional 20 minutes and then allowed to warm up to about −20° C. Thereafter, methanol and water were added and the mixture worked up in a manner previously described to obtain an N,N-dimethyl-2,2-diphenylacetamide product having a melting point of 131° to 134° C.

About one-third of the suspension prepared as above described and containing about 0.06 mole of diphenylmethyl sodium was added to a similar xylene solution containing 7 grams (0.065 mole) of N,N-dimethylcarbamyl chloride while the mixture was boiling (about 125° to about 130° C.) over a period of about 10 minutes. After completion of the addition, the refluxing mixture was heated an additional 5 minutes and then cooled down and worked up in a manner previously described to obtain an N,N-dimethyl-2,2-diphenylacetamide product melting from 130° to 134° C.

EXAMPLE 5

N,N-diethyl-2,2-diphenylacetamide

In a manner similar to that previously described, a suspension of about 0.06 mole of diphenylmethyl sodium in about 42 milliliters of diethylbenzene, prepared in a manner similar to that described in Example 1, was added with stirring over a period of about 15 minutes to a solution of 8.8 grams (0.065 mole) of diethylcarbamyl chloride in 50 milliliters of xylene while the temperature is maintained at about 5° to 10° C. whereupon a reaction took place with the formation of N,N-diethyl-2,2-diphenylacetamide product and sodium chloride by-product. Fifty milliliters of water and 3 milliliters of acetic acid were added and the mixture was heated to 50° C., the layers were allowed to separate and the aqueous layer was drawn off. The organic layer was washed with 50 milliliters of warm water, and then the xylene and diethylbenzene were removed by distillation under vacuum. The residue was taken up in Skelly B and the solution was cooled to precipitate the desired N,N-diethyl-2,2-diphenylacetamide, identified by melting point and mixed melting point with an authentic sample.

EXAMPLE 6

N,N-di-n-butyl-2,2-diphenylacetamide

In a manner similar to that previously described, a suspension of about 0.50 mole of diphenylmethyl sodium in 325 milliliters of xylene, prepared in a manner similar to that described in Example 1, is added with stirring over a period of about 20 minutes to a solution of 95.8 grams (0.50 mole) of di-n-butylcarbamyl chloride in 200 milliliters of xylene while the temperature is maintained at about 5° C. whereupon a reaction takes place with the formation of an N,N-di-n-butyl-2,2-diphenylacetamide product and sodium chloride by-product. The reaction mixture is then worked up in a manner similar to that described in Example 5 to obtain an N,N-di-n-butyl-2,2- diphenylacetamide product having a molecular weight of 323.

Some of the disubstituted carbamyl chlorides which are reactants in the process of the present invention are available commercially. Others may be prepared by a vapor phase reaction above 100° C. between a disubstituted amine and phosgene as more particularly described in a paper by Slocombe et al., J. Am. Chem. Soc., 72, 1888 (1950).

Sodium dispersion employed in the preparation of diphenylmethyl sodium is available commercially. It may also be prepared by heating sodium and an aromatic hydrocarbon solvent with a minor amount of aluminum monostearate in an inert atmosphere to above the melting point of sodium and rapidly agitating the mixture in a suitable apparatus such as those available under trade names such as "Dispersator."

We claim:
1. In a process for preparing N-substituted amides of diphenylacetic acid having the formula

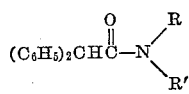

which involves the reaction of diphenylmethyl sodium and a carbamyl chloride having the formula

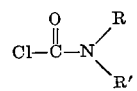

wherein in the above formulas, each of R and R' is a lower alkyl group, the improvement which comprises adding diphenylmethyl sodium dispersed in an inert diluent to said carbamyl chloride.

2. A process according to claim 1 wherein said diphenylmethyl sodium dispersed in an inert diluent is added slowly with stirring to said carbamyl chloride in the temperature range of from about −15° C. to about 50° C.

3. A process according to claim 1 wherein each of R and R' is methyl.

4. A process according to claim 2 wherein each of R and R' is methyl.

5. A process according to claim 1 wherein each of R and R' is ethyl.

References Cited

UNITED STATES PATENTS 3,141,041   7/1964   Taylor _____ 260—558

WALTER A. MODANCE, *Primary Examiner.*

N. TROUSOF, *Assistant Examiner.*